United States Patent
Kamisuwa et al.

(10) Patent No.: US 7,474,988 B2
(45) Date of Patent: Jan. 6, 2009

(54) MAINTENANCE SYSTEM AND METHOD AND PROGRAM THEREFOR

(75) Inventors: Yoshikatsu Kamisuwa, Shinagawa-ku (JP); Rintaro Nakane, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 345 days.

(21) Appl. No.: 11/277,208

(22) Filed: Mar. 22, 2006

(65) Prior Publication Data

US 2007/0225850 A1 Sep. 27, 2007

(51) Int. Cl.
*G06F 11/30* (2006.01)
*G21C 17/00* (2006.01)

(52) U.S. Cl. ...................................... 702/184
(58) Field of Classification Search ......... 702/179–181, 702/183–185; 705/400
See application file for complete search history.

(56) References Cited

U.S. PATENT DOCUMENTS

| | | | | |
|---|---|---|---|---|
| 6,532,426 | B1 * | 3/2003 | Hooks et al. | 702/81 |
| 6,738,748 | B2 * | 5/2004 | Wetzer | 705/9 |
| 7,082,384 | B2 * | 7/2006 | Sasaki et al. | 702/184 |
| 2003/0158772 | A1 * | 8/2003 | Harris | 705/10 |
| 2005/0002054 | A1 * | 1/2005 | Shoji et al. | 358/1.14 |
| 2005/0015283 | A1 * | 1/2005 | Iino et al. | 705/4 |
| 2005/0080596 | A1 * | 4/2005 | Duckert et al. | 702/184 |
| 2005/0286742 | A1 * | 12/2005 | Rasmussen et al. | 382/112 |
| 2008/0002995 | A1 * | 1/2008 | Kamisuwa et al. | 399/8 |
| 2008/0062211 | A1 * | 3/2008 | Kamisuwa et al. | 347/5 |

FOREIGN PATENT DOCUMENTS

JP 2004-152017 5/2004

OTHER PUBLICATIONS

English Abstract of JP 2004-152017, Takeuchi et al., May 27, 2004.*

* cited by examiner

*Primary Examiner*—Michael P Nghiem
(74) *Attorney, Agent, or Firm*—SoCal IP Law Group LLP; Steven C. Sereboff; John E. Gunther

(57) ABSTRACT

To provide a technique of reducing the costs for maintenance work and also the downtime of products. There is provided a maintenance system that calculates a timing to make a visit for maintenance work for consumable parts of a machine to be maintained. The maintenance system includes: a visit-interval calculating section for calculating a visit interval to make a visit for maintenance work for each consumable part on the basis of a failure rate distribution; a replacement-interval calculating section for calculating a replacement interval to replace the consumable parts for each consumable part on the basis of the failure rate distribution; and a visit-timing calculating section for calculating a timing to actually visit the machine to be maintained on the basis of the visit interval calculated by the visit-interval calculating section and the replacement interval calculated by the replacement-interval calculating section.

20 Claims, 9 Drawing Sheets

FIG.4

| ID | MACHINE. ID | MACHINE TYPE. NAME | CONSUMABLE PART. ABBREVIATED NAME | VISIT DATE | COUNT | FAILURE INTERVAL | END OF LIFE |
|---|---|---|---|---|---|---|---|
| 020901005 | 100213 | MACHINE TYPE A | SETUP | 2002/9/1 | 0 | 0 | — |
| 030128001 | 100213 | MACHINE TYPE A | NO PROBLEM | 2003/1/28 | 515907 | — | — |
| 030407010 | 100213 | MACHINE TYPE A | PHOTOCONDUCTOR DRUM | 2003/4/7 | 746343 | 241052 | × |
| 030421001 | 100213 | MACHINE TYPE A | PHOTOCONDUCTOR DRUM | 2003/4/21 | 786417 | 40074 | × |
| 021115001 | 102399 | MACHINE TYPE A | PHOTOCONDUCTOR DRUM | 2002/11/15 | 52354 | 33466 | × |
| 021120002 | 102399 | MACHINE TYPE A | PHOTOCONDUCTOR DRUM | 2002/11/20 | 53366 | 1012 | × |
| 021122001 | 102399 | MACHINE TYPE A | PHOTOCONDUCTOR DRUM | 2002/11/22 | 54450 | 1084 | × |
| 030523008 | 102399 | MACHINE TYPE A | ALL PM REPLACED | 2003/5/23 | 570954 | 516504 | ○ |
| 030529011 | 102399 | MACHINE TYPE A | NO REPRODUCTION | 2003/5/27 | 572918 | — | — |
| 030529004 | 102399 | MACHINE TYPE A | CHARGER WIRE | 2003/5/29 | 578500 | 7546 | — |
| 031217001 | 102400 | MACHINE TYPE A | ALL PM REPLACED | 2003/12/17 | 1211848 | 136328 | ○ |
| 031218003 | 102400 | MACHINE TYPE A | FUSING ROLLER 1 | 2003/12/18 | 1211898 | 50 | — |
| 030507006 | 112240 | MACHINE TYPE A | PHOTOCONDUCTOR DRUM | 2003/5/7 | 1108467 | 12356 | × |
| 030714003 | 139855 | MACHINE TYPE B | ALL PM REPLACED | 2003/7/14 | 1465441 | 305552 | — |
| 030723003 | 139855 | MACHINE TYPE B | DOCUMENT GLASS PLATE SMUDGED | 2003/7/23 | 1465490 | 49 | — |

| MACHINE TYPE. NAME | ABBREVIATED NAME | | FAILURE DISTRIBUTION GROUP | FAILURE DISTRIBUTION PARAMETER1 | FAILURE DISTRIBUTION PARAMETER2 | FAILURE DISTRIBUTION PARAMETER3 |
|---|---|---|---|---|---|---|
| MACHINE TYPE A | PHOTOCONDUCTOR DRUM | | 0 | 3.2 | 623K | - |
| MACHINE TYPE A | FEED ROLLER | | 0 | 5.1 | 500K | - |
| MACHINE TYPE A | TRANSFER BELT | | 0 | 1.2 | 821K | - |
| ~ | | | | | | |
| MACHINE TYPE B | PHOTOCONDUCTOR DRUM | | 0 | 1.5 | 790K | - |
| MACHINE TYPE B | FEED ROLLER | | 0 | 5.3 | 520K | - |
| ~ | | | | | | |

| ID | | COUNT PROGRESS AVERAGE | COUNT PROGRESS DISPERSION | VISIT DATE | COUNT | |
|---|---|---|---|---|---|---|
| 100213 | | 2634 | 1815 | 2003/9/23 | 1025392 | |
| 102399 | | 4565 | 3212 | 2004/1/13 | 1279732 | |
| 102400 | | 6012 | 3604 | 2004/1/28 | 2697196 | |
| ~ | | | | | | |

| MACHINE. ID | CONSUMABLE PART. ABBREVIATED NAME | COUNT ACQUISITION DATE | COUNT | |
|---|---|---|---|---|
| 102399 | PHOTOCONDUCTOR DRUM | 2003/5/23 | 0 | |
| 102399 | CHARGER WIRE | 2003/5/29 | 0 | |
| 102399 | TRANSFER BELT | 2003/5/23 | 0 | |
| ~ | | | | |
| 112400 | PHOTOCONDUCTOR DRUM | 2003/5/7 | 0 | |
| 112400 | CHARGER WIRE | 2003/3/25 | 0 | |
| ~ | | | | |

FIG.9

SAMPLE1

| MACHINE. ID | ABBREVIATED NAME | VISIT INTERVAL | FAILURE INTERVAL |
|---|---|---|---|
| 100213 | PHOTOCONDUCTOR DRUM | 600K | 540K |
| 100213 | FEED ROLLER | 480K | 430K |
| | ... | | |
| 100213 | TRANSFER BELT | 750K | 670K |

SAMPLE2

| MACHINE. ID | ABBREVIATED NAME | VISIT INTERVAL | FAILURE INTERVAL |
|---|---|---|---|
| 100213 | PHOTOCONDUCTOR DRUM | 550K | 530K |
| 100213 | FEED ROLLER | 500K | 450K |
| | ... | | |
| 100213 | TRANSFER BELT | 800K | 740K |

SAMPLE3

| MACHINE. ID | ABBREVIATED NAME | VISIT INTERVAL | FAILURE INTERVAL |
|---|---|---|---|
| 100213 | PHOTOCONDUCTOR DRUM | 450K | 450K |
| 100213 | FEED ROLLER | 460K | 400K |
| | ... | | |
| 100213 | TRANSFER BELT | 770K | 740K |

⋮

SAMPLE2000

| MACHINE. ID | ABBREVIATED NAME | VISIT INTERVAL | FAILURE INTERVAL |
|---|---|---|---|
| 100213 | PHOTOCONDUCTOR DRUM | 580K | 550K |
| 100213 | FEED ROLLER | 460K | 440K |
| | ... | | |
| 100213 | TRANSFER BELT | 850K | 830K |

FIG.10

| STRATEGY NO. | COST |
|---|---|
| 1 | 0.658 |
| 2 | 0.667 |
| 3 | 0.701 |
| 4 | 0.558 |
| 5 | 0.667 |
| ... | |
| 112 | 0.489 |
| ... | |
| 2000 | 0.600 |

# MAINTENANCE SYSTEM AND METHOD AND PROGRAM THEREFOR

BACKGROUND OF THE INVENTION

1. Field of the Invention

The present invention relates to a technique of estimating the time when a product composed of a plurality of parts fails and the degree of degradation of the parts, and reflecting them in maintenance planning.

2. Description of the Related Art

Conventional maintenance planning has depended on the experience and guesswork of servicemen. This has obstructed balancing the risk of user's loss due to the reason that products become unavailable and the cost of maintenance.

Specifically speaking, to reduce the risk of product failure, parts with high risk of failure are replaced before the end of the life, so that excessive replacement is carried out, increasing maintenance cost. In contrast, when products are used to the end of life so as to decrease the maintenance cost, servicemen have to make a visit after the products fail, thus increasing downtime to increase user's loss due to the reason that the products are unavailable. Consequently, the risk and the cost are in a trade-off relationship.

Some other business sectors adopt maintenance planning based on costs and risks. It is, however, difficult to estimate the costs when replacement parts (consumable parts) increase in number. In other words, at the time of determining if consumable parts should be replaced, it takes extremely high calculation cost to determine the best maintenance planning for the best combinations of consumable parts to be replaced. In addition, since it cannot be determined that how much the next visit time is delayed, the cost cannot be simply calculated.

SUMMARY OF THE INVENTION

The invention is made to solve the above-described problems. Accordingly, it is an object of the invention to provide a technique of reducing maintenance costs and also product downtime losses.

In order to achieve the above object, according to the invention, there is provided a maintenance system that calculates a timing to make a visit for maintenance work of consumable parts of a machine to be maintained. The system includes: a visit-interval calculating section for calculating a visit interval to make a visit for maintenance work for each consumable part on the basis of a failure rate distribution; a replacement-interval calculating section for calculating a replacement interval to replace the consumable parts for each consumable part on the basis of the failure rate distribution; and a visit-timing calculating section for calculating a timing to actually visit the machine to be maintained on the basis of the visit interval calculated by the visit-interval calculating section and the replacement interval calculated by the replacement-interval calculating section.

According to the invention, there is provided a maintenance method for calculating a timing to make a visit for maintenance work of consumable parts of a machine to be maintained. The method includes: a failure-rate-distribution calculating step of calculating the failure rate distribution of each consumable part on the basis of maintenance historical data, that is, history information on maintenance work performed for the machine to be maintained; a visit-interval calculating step of calculating a visit interval to make a visit for maintenance work for each consumable part on the basis of the failure rate distribution calculated in the failure-rate-distribution calculating step and the maintenance historical data; a replacement-interval calculating step of calculating a replacement interval to replace the consumable parts for each consumable part on the basis of the failure rate distribution calculating in the failure-rate-distribution calculating step and the maintenance historical data; and a visit-timing calculating step of calculating a timing to actually visit the machine to be maintained on the basis of the visit interval calculated in the visit-interval calculating step and the replacement interval calculated in the replacement-interval calculating step.

According to the invention, there is provided a maintenance program for a computer to execute a process of calculating a timing to make a visit for maintenance work for consumable parts of a machine to be maintained. The program includes: a failure-rate-distribution calculating step of calculating the failure rate distribution of each consumable part on the basis of maintenance historical data, that is, history information on maintenance work performed for the machine to be maintained; a visit-interval calculating step of calculating a visit interval to make a visit for maintenance work for each consumable part on the basis of the failure rate distribution calculated in the failure-rate-distribution calculating step and the maintenance historical data; a replacement-interval calculating step of calculating a replacement interval to replace the consumable parts for each consumable part on the basis of the failure rate distribution calculated in the failure-rate-distribution calculating step and the maintenance historical data; and a visit-timing calculating step of calculating a timing to actually visit the machine to be maintained on the basis of the visit interval calculated in the visit-interval calculating step and the replacement interval calculated in the replacement-interval calculating step.

BRIEF DESCRIPTION OF THE DRAWINGS

FIG. 4 is a diagram showing the details of a maintenance history table;

FIG. 5 is a diagram showing the details of a consumable part table;

FIG. 6 is a diagram showing the details of a machine table;

FIG. 7 is a diagram showing the details of a consumable-part condition table;

FIG. 9 is a diagram of samples in which maintenance strategy for the machine is set;

FIG. 10 is a diagram showing the results of simulation for the samples; and

DESCRIPTION OF THE EMBODIMENT

An embodiment of the invention will be described hereinbelow with reference to the drawings.

Figure 1:
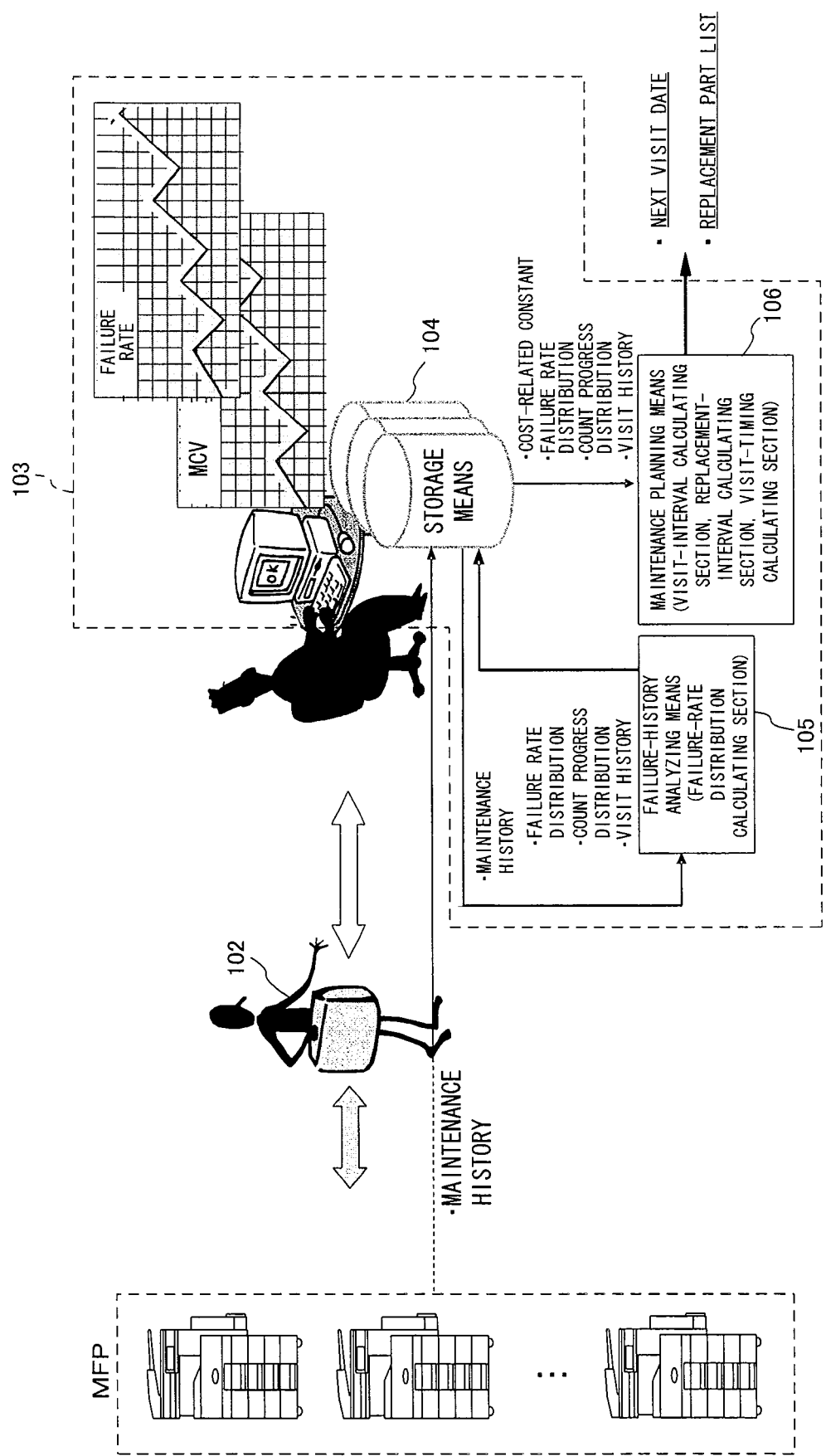
FIG. 1 is a schematic diagram of a maintenance system according to an embodiment of the invention.

FIG. 1 is a schematic diagram of a maintenance system according to an embodiment of the invention. FIG. 1 shows an example in which a serviceman 102 maintains a plurality of multifunctional peripherals (MFPs) installed at a user, with one service center having a maintenance system 103 as the base.

In conventional maintenance, the serviceman 102 has visited a user every preventive maintenance (PM) set for each MFP, and performed replacement of consumable parts, and cleaning and checking of the operations of MFPs. The serviceman 102 also has made a visit to repair the MFPs when called from the user in case of accidental failure, in addition to PM.

For the PM work, since one MFP includes a plurality of consumable parts, all the consumable parts are not always degraded at the PM. Accordingly, replacing consumable parts that have not yet reached the end of life causes losses. Also, replacing only failed consumable parts at the occurrence of accidental failure causes replacement time gap to the cycle of the PM.

Accordingly, the serviceman 102 controls the replacement time for the consumable parts individually on the basis of the experience while taking the set PM cycle as the base to thereby reduce losses. However, cutting down on costs by excessively delaying replacement time to increase the available time of consumable parts increases the risk of the failure of the consumable parts, resulting in the loss on the user due to the reason that the MFP becomes unavailable. Also, varying replacement time from item to item will increase the number of visits, resulting in an increase in maintenance cost.

Accordingly, the maintenance system 103 according to the embodiment is configured to calculate the failure rate distribution for each consumable part on the basis of past maintenance historical data and to calculate a next visit time and the list of consumable parts to be replaced at that time from the calculated failure-rate distribution.

The maintenance system 103 includes a storage means 104 for storing a maintenance history; a failure-history analyzing means (failure-rate-distribution calculating section) 105 that analyzes the maintenance history stored in the storage means 104 to obtain a failure rate distribution, a count progress distribution, and a visit history, and stores them in the storage means 104; and a maintenance planning means (a visit-interval calculating section, a replacement-interval calculating section, and a visit-timing calculating section) 106 for determining visit time and replacement parts from cost-related constants, the failure rate distribution, the count progress distribution, and the visit history which are stored in the storage means 104.

Figure 2:
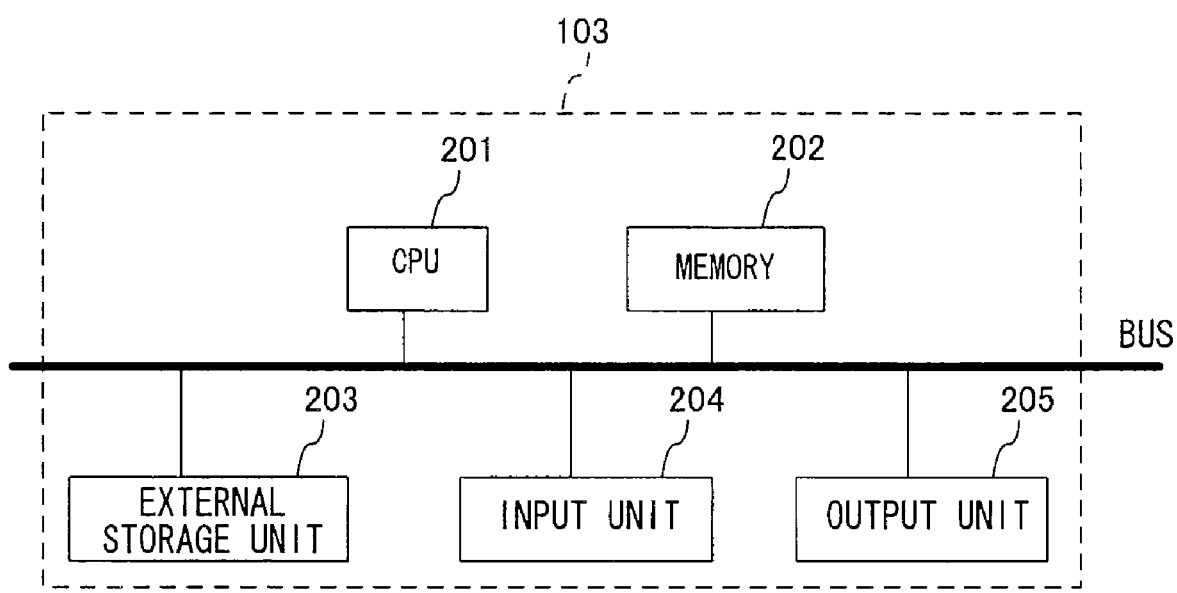
FIG. 2 is a block diagram showing the system configuration of a maintenance system 103.

FIG. 2 is a block diagram showing the system configuration of the maintenance system 103. As shown in FIG. 2, the maintenance system 103 includes a CPU 201, a memory 202 connected to the CPU 201 via a bus, an external storage unit 203, an input unit 204, and an output unit 205. The storage means 104 shown in FIG. 1 corresponds to the external storage unit 203, while the failure-history analyzing means 105 and the maintenance planning means 106 are configured for the calculations of the CPU 201.

The CPU 201 is responsible for executing various processings of the maintenance system 103, and also for achieving various functions by executing the programs stored in the memory 202. The memory 202 is, e.g., a ROM or a RAM, and is responsible for storing various information and programs used in the maintenance system 103.

Figure 3:
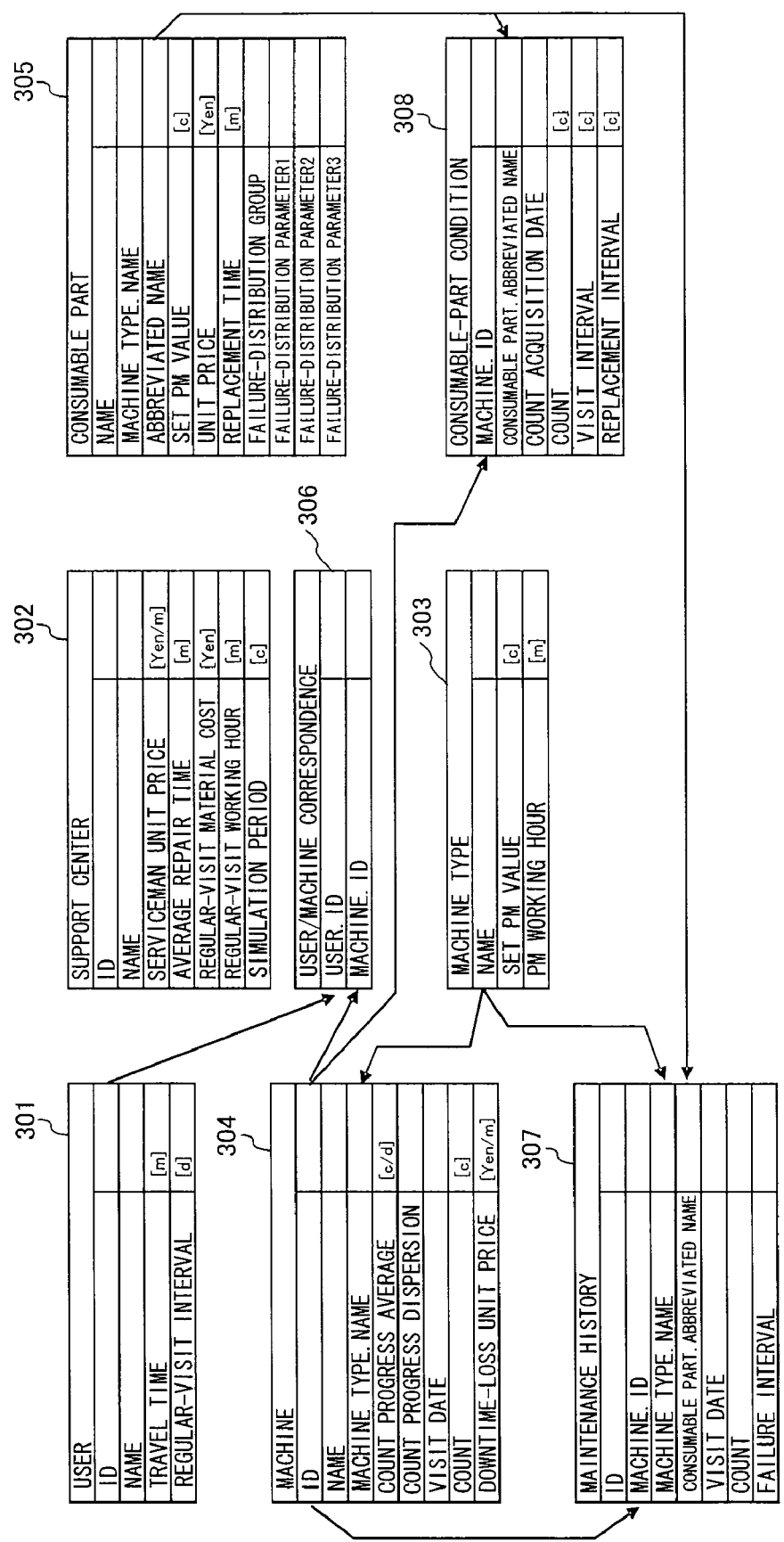
FIG. 3 shows a format of data for use in the maintenance system 103.

FIG. 3 shows a format of data for use in the maintenance system 103, in which eight tables are defined. The tables are a user table 301 in which constants associated with a user are set; a support center table 302 in which constants for a support center are set; a machine type table 303 in which constants for a machine type are set; a machine table 304 in which variables calculated from the constants for a machine and the condition of use are set; a consumable part table 305 in which constants for a consumable part and failure-rate variables calculated from market data are set; a user-to-machine table 306 indicative of the correspondence between a user and a machine; a maintenance history table 307 in which the history of maintenance work by a serviceman is recorded; and a consumable-part condition table 308 in which the condition of a consumable part is set. These tables are stored in the storage means 104. The arrows in the figure each indicate that the attribute at the base of the arrow is set to the attribute of the end of the arrow. The character string ahead of "." in the attribute at the end of the arrow indicates the name of a reference table, while the character string after "." indicates the name of the attribute of the reference. For example, "machine.ID" in the maintenance history table 307 indicates "ID" in the machine table 304.

The serviceman 102 updates the maintenance history table 307 in the storage means 104 from the work sheet describing a maintenance report according to the format of the maintenance history table 307. The maintenance history table 307 is an example of data updated.

The failure-history analyzing means 105 estimates the failure rate distribution for each consumable part on the basis of the maintenance history table 307 by substitution to Weibull distribution, which is widely used in failure distribution analysis (a failure-rate-distribution calculating step), $$F(t)=1-\exp(-t/\eta)^m \text{ ($m$ is a shape parameter, and $\eta$ is a scale parameter)}$$

Here a photoconductor drum which is a consumable part of a machine type A will be described as an example of the MFP.

First, the operation of the failure-history analyzing means 105 will be specifically described.

The failure-history analyzing means 105 extracts data on the photoconductor drum from the maintenance history table 307 read from the storage means 104 to obtain the failure rate distribution of the photoconductor drum, and calculates a failure interval. Specifically, the failure-history analyzing means 105 extracts all the tuples in which "machine type.name" is "type A" and "consumable part.abbreviated name" is "photoconductor drum" and all the tuples in which "machine type.name" is "type A" and "consumable part.abbreviated name" is "all PM replaced (indicating that all consumable parts have been replaced) from the maintenance history table 307 described in FIG. 4, and calculates a failure interval from the difference from the count of the preceding replacement.

The column "end of life" on the right end of the maintenance history table 307 shown in FIG. 4 is added for the description. Items indicated by "x" are data when the photoconductor drum failed before PM, while items indicated by "o" are data when the photoconductor drum was replaced without failure because it reached PM. Data including the data (items of "o") of items replaced before failure is referred to as closed data. A known method for analyzing such data includes "a cumulative hazard method". The failure-history analyzing means 105 estimates a shape parameter m and a scale parameter η of Weibull distribution from the extracted failure intervals of the tuples by the cumulative hazard method, and updates the failure-distribution variables in the consumable part table 305 detailed in FIG. 5.

Specifically speaking, the failure-history analyzing means 105 extracts tuples in which "machine type.name" is "type A" and "abbreviated name" is "photoconductor drum" from the consumable part table 305 shown in FIG. 5, and subtracts the shape parameter m to "failure distribution parameter 1" and the scale parameter η to "failure distribution parameter 2" (K indicates ×10³). For "failure distribution group", a constant "0" corresponding to Weibull distribution is set. The calculation is made for each of the consumable parts to update the consumable part table 305 in the storage means 104. The consumable part table 305 of FIG. 5 is an example of data updated.

At the same time, the failure-history analyzing means 105 calculates a copy-number progress distribution per day for each machine with the maintenance history table 307. Specifically, the failure-history analyzing means 105 extracts tuples of the same ID from the maintenance history table 307, and calculates the mean value and the dispersion of the count progress from the difference between visit date (the number of days) and changes in count (the degree of progress) to update the "count progress average" and the "count progress dispersion" in the machine table 304 detailed in FIG. 6. The failure-history analyzing means 105 also updates the latest visit date and the replacement date for the consumable parts for each machine. For the visit date, the latest visit date and the "count" at that time of all the tuples extracted using "machine.ID" from the maintenance history table 307 are set, as the latest count data, to the "visit date" and the "count" in the machine table 304. The machine table 304 in FIG. 6 shows an example of data updated.

For the replacement date for the consumable parts, the latest "visit date" in the tuples of the consumable parts, "all PM replaced", and "setup" in the column of "consumable part.abbreviated name" are extracted from all the tuples extracted for "machine.ID" from the maintenance history table 307, and the latest "visit date" is set in the "count acquisition date" in the consumable-part condition table 308 detailed in FIG. 7. Value "0" is set for the "count" in the consumable-part condition table 308. The consumable-part condition table 308 of FIG. 7 shows an example of data updated.

The operation of the maintenance planning means 106 will next be described.

The maintenance planning means 106 has "a strategy plotting mode" and "a visit-date presenting mode". The strategy plotting mode is executed when a fixed amount of maintenance historical data is added or at regular timings such as once per month. The visit-date presenting mode is executed every day. The modes will be specifically described hereinbelow.

Strategy Plotting Mode

Figure 8:
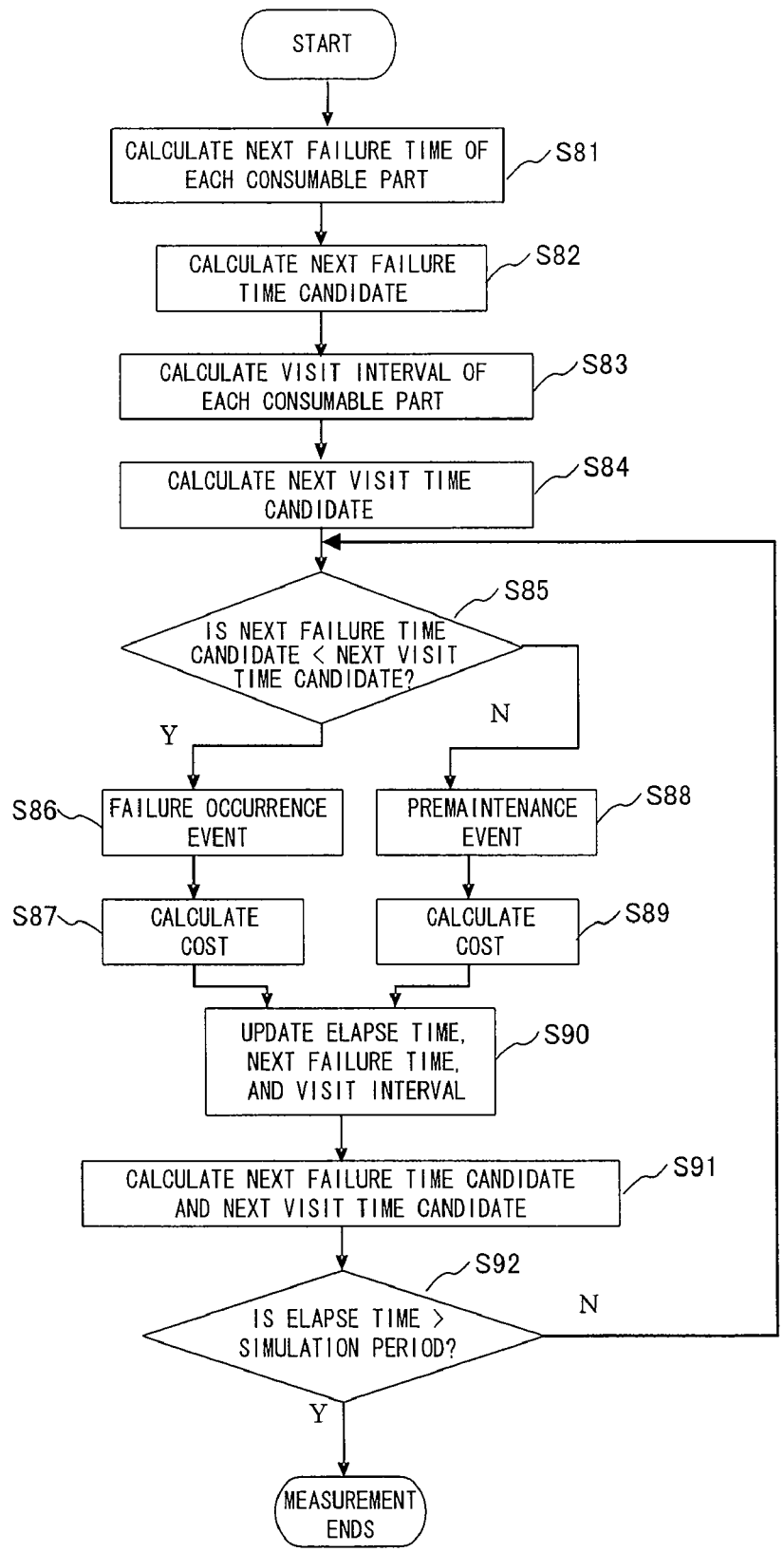
FIG. 8 is a flowchart for the process of a strategy plotting mode.

The details of the processing in the strategy plotting mode will be described with reference to the flowchart of FIG. 8.

"A visit interval" to make a visit for maintenance work and "a replacement interval" to replace consumable parts are calculated and set for each consumable part of each machine. The serviceman 102 performs maintenance work according to the visit interval and the replacement interval. Specifically, the serviceman 102 makes a visit to a specific machine to be maintained even if one of consumable parts reaches the visit interval, and replaces all consumable parts that have reached the replacement interval. Here the visit interval and the replacement interval do not indicate a simple time interval but are expressed by a count value indicative of the number of sheets processed by MFPs to be maintained. This expression by count values allows maintenance according to the results of actual use of MFPs to be maintained.

A method for calculating the "visit interval" and the "replacement interval" will be specifically described.

The maintenance planning means 106 simulates the maintenance work for a period set in the "simulation period" of the support center table 302, and calculates a visit interval and a replacement interval in which the costs are minimized. For the method of calculation, for example, random visit interval and replacement interval are set using a heuristic method such as a Monte Carlo method or a generic algorithm, and the simulation of maintenance work is repeated to calculate the costs, of which a visit interval and a replacement interval in which the costs is minimized are adopted. Although the longer the simulation period is the better, the calculation time increases correspondingly. It is therefore desirable that an enough period be set for an average machine failure time. The costs here indicate the sum of labor costs for the serviceman 102, the cost of materials of replaced consumable parts, losses (downtime losses) due to the reason that a user cannot use the machine because of unexpected failure.

A specific example of the simulation using the Monte Carlo method will be described. FIG. 9 shows samples in which maintenance strategies (combinations of a visit interval and a replacement interval for each consumable part) for a machine whose "machine.ID" is 100213 are set, in which 2,000 kinds of maintenance strategy samples are produced at random (a visit-interval calculating step and a replacement-interval calculating step). Although the samples are basically produced at random, it is desirable to produce the samples in the vicinity of a visit interval and a replacement interval estimated empirically from the failure rate distribution of each consumable part so as to produce no useless sample. Maintenance work simulation is performed for each of the 2,000 maintenance strategies to obtain a sample with the minimum cost. The maintenance work simulation for the maintenance strategy sample 1 will next be described with reference to FIG. 8.

The maintenance planning means 106 compares the "machine.name" of the machine table 304 (not shown in FIG. 5, refer to FIG. 2) and the "machine type.name" of the consumable part table 305 (refer to FIG. 4) for the "machine.ID" 100213 to extract all the tuples in the consumable part table 305. The maintenance planning means 106 then generates random numbers by a known method on the basis of the failure probability indicated by the "failure distribution group", "failure distribution parameter 1", and "failure distribution parameter 2" in the consumable part table 305 to calculate the next failure times of the consumable parts (S81). The shortest of the calculated next failure times is set to a next failure time candidate (S82).

The maintenance planning means 106 also compares the "ID" in the machine table 304 and the "machine.ID" in the consumable-part condition table 308 to extract all conforming tuples in the consumable-part condition table 308, and calculates the next visit of the serviceman 102. Specifically, the maintenance planning means 106 calculates the "visit interval" set in the sample 1 of FIG. 9 for the extracted consumable-part condition (a visit-interval calculating step) (S83), and sets the shortest as a next visit time candidate (S84).

The calculated next-failure-time candidate and next-visit-time candidate are compared, whereby an event is determined. When the next-failure-time candidate is shorter than the next visit-time candidate (Y in S85), the next-failure-time candidate is set to an elapse time as a failure occurrence event (S86). Then consumable parts to be replaced are determined and the costs thereof are calculated.

Among all the consumable parts except failed consumable parts, those whose replacement interval is shorter than the next failure time candidate are determined to be consumable parts to be replaced, with reference to the "replacement interval" in the consumable-part condition table 308 calculated in advance (in the replacement-interval calculating step), and the costs thereof are calculated as the sum of the labor costs, the costs of materials, and downtime losses (S87).

labor costs=("user.travel time"+Σ "consumable part.replacement time" of consumable part to be replaced) ×unit price of serviceman material costs=Σ "consumable part.unit price" of consumable part to be replaced downtime losses ="user.travel time"×"machine.downtime loss unit price"

The "user.travel time" indicates a travel time from a support center to a user address.

When the next failure time candidate is longer than the next visit time candidate (N in S85), the next visit time candidate is set to an elapse time as a premaintenance event (S88). Consumable parts to be replaced are determined and the costs are calculated.

Among all the consumable parts except consumable parts to be premaintained (related to the visit interval), those shorter than the next visit time candidate are determined to be consumable parts to be replaced, with reference to the "replacement interval" in the preset consumable-part condition table 308, and the costs are obtained as the sum of the labor costs, material costs, and downtime losses (S89).

labor costs=("user.travel time"+Σ "consumable part.replacement time" of consumable part to be replaced)×unit price of serviceman material costs=Σ "consumable part.unit price" of consumable part to be replaced downtime losses =0

The downtime here is set to 0 on the assumption that the serviceman 102 works while the user is not using the machine under an agreement with the user, and the time until the serviceman 102 runs to the user in case of unexpected failure is assumed to be downtime.

At the occurrence of the event, for replaced consumable parts, a next failure time is newly calculated, and for consumable parts that are not replaced, the elapse time is subtracted from each of the next failure time and the visit interval calculated, and the next failure time and the visit interval are updated (S90). In this manner, the determination of the next failure time candidate and the next visit time candidate (S91), the determination of event, the determination of consumable parts to be replaced, and the calculation of costs are repeated until the elapsed time ends during the simulation period (N in S92).

One set of the simulation is repeated for all the samples of FIG. 9, from which a sample in which the calculated cost is the minimum is adopted, and "consumable-part condition. visit interval" and "consumable-part condition.replacement interval" are set as the optimum strategy (a visit-timing calculating step). FIG. 10 shows the results of simulation for the samples. In this example, the cost per one count in the 112th sample is the minimum, so that it is adopted as the optimum strategy.

Visit-Date Presenting Mode

The "visit-date presenting mode" will be described. The "visit-date presenting mode" assumes a case in which the serviceman 102 checks the next visit date. Desirable visit interval and replacement interval are set in advance in the strategy plotting mode. The serviceman 102 checks the visit date by inputting the "machine.ID" of a machine in his charge.

The maintenance planning means 106 compares the "ID" in the machine table 304 and the "machine.ID" in the consumable-part condition table 308 to extract all conforming tuples in the consumable-part condition table 308, and refers to "count acquisition date", "count", "visit interval", and "replacement interval". The maintenance planning means 106 also refers to "count progress average" in the machine table 304. The maintenance planning means 106 then calculates scheduled visit date for each consumable part by the following expression.

scheduled visit date=count acquisition date+visit interval/count progress average The shortest of the scheduled visit dates of the consumable parts is determined as a visit date. Next, a scheduled replacement date is calculated for consumable parts except that of the shortest scheduled visit date by the following expression.

scheduled replacement date=count acquisition date+ replacement interval/count progress average A consumable parts whose scheduled replacement date is shorter than the visit date is determined as a consumable part to be replaced, and is presented together with the visit date.

The visit date may be estimated by period using the "count progress distribution" in the machine table 304.

Accordingly, in the above-described embodiment, the setting of two references, the visit interval and the replacement interval, for each consumable part enables the serviceman 102 to know "when to make a visit" and "which consumable part to be replaced".

The calculating of a desirable visit interval and replacement interval in advance, and normally calculating the next visit date according to the determined strategy reduces calculation cost.

Figure 11:
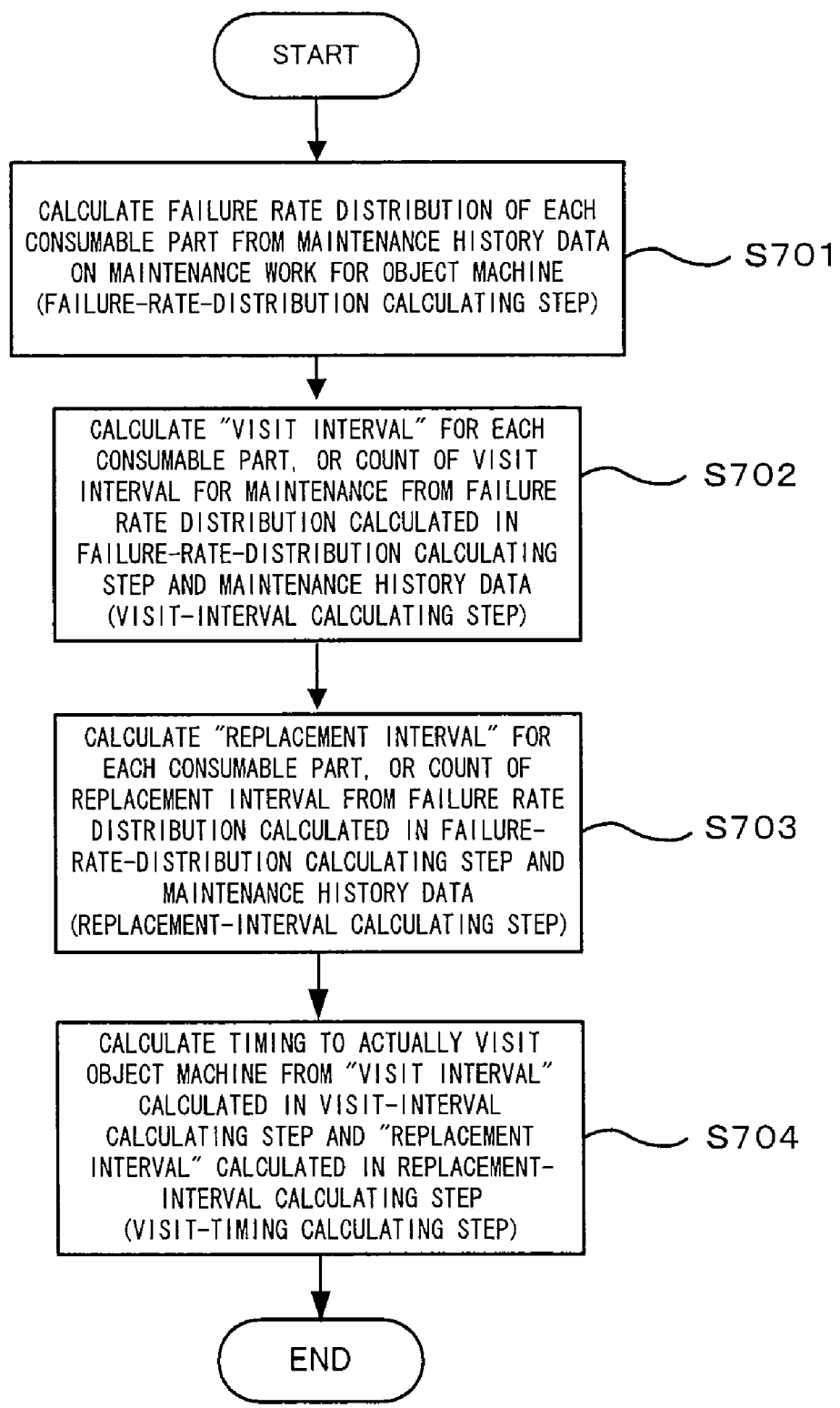
FIG. 11 is a flowchart for the process (maintenance method) of the maintenance system according to the embodiment.

FIG. 11 is a flowchart for the process (maintenance method) of the maintenance system according to the embodiment.

The failure-history analyzing means 105 calculates the failure rate distribution for consumable parts on the basis of maintenance historical data, that is, history information on the maintenance work executed for machines to be maintained (the failure-rate-distribution calculating step) (S701).

The maintenance planning means 106 calculates "visit interval", that is, the count of visit interval for maintenance, on the basis of the failure rate distribution calculated in the failure-rate-distribution calculating step and the maintenance historical data (the visit-interval calculating step)(S702).

The maintenance planning means 106 calculates "replacement interval", that is, the count of replacement interval of consumable parts, on the basis of the failure rate distribution calculated in the failure-rate-distribution calculating step and the maintenance historical data (the replacement-interval calculating step)(S703). In the visit-interval calculating step and the replacement-interval calculating step, values close to intervals at which the failure rate is estimated to be higher than a predetermined rate are calculated, on the basis of the failure rate distribution of the consumable parts, which is calculated in the failure-rate-distribution calculating step.

The maintenance planning means 106 calculates the timing to actually visit a machine to be maintained on the basis of the "visit interval" calculated in the visit-interval calculating step and the "replacement interval" calculated in the replacement-interval calculating step (the visit-timing calculating step) (S704).

The steps of the process (maintenance method) of the maintenance system described above are achieved by the CPU 201 through the execution of a maintenance program stored in the memory 202.

The embodiment has been described for the case in which the function of executing the invention is stored in the apparatus in advance. However, it is to be understood that the invention is not limited to that but the same function may be downloaded to the system via a network, or alternatively, the same function stored in a memory medium may be installed to the system. The memory medium may be any type of medium, such as CD-ROMs, that can store programs and can be read by the system. The function acquired in advance by installation or downloading may be achieved in cooperation with the operating system (OS) or the like in the system.

While the invention has been described in detail with reference to a specific embodiment, it will be understood by those skilled in the art that various changes and modifications may be made without departing from the spirit and scope of the invention.

The invention can provide a technique of reducing the costs for maintenance and also the downtime of products.

What is claimed is:

1. A maintenance system that calculates a timing to make a visit for maintenance work of consumable parts of a machine to be maintained; the system comprising:
    a visit-interval calculating section for calculating a visit interval to make a visit for maintenance work for each consumable part on the basis of a failure rate distribution;
    a replacement-interval calculating section that calculates a replacement interval to replace the consumable parts for each consumable part on the basis of the failure rate distribution; and
    a visit-timing calculating section that calculates a timing to actually visit the machine to be maintained on the basis of the visit interval calculated by the visit-interval calculating section and the replacement interval calculated by the replacement-interval calculating section.

2. The maintenance system according to claim 1, further comprising:
    a failure-rate-distribution calculating section that calculates the failure rate distribution of each consumable part on the basis of maintenance historical data, that is, history information on maintenance work performed for the machine to be maintained, wherein
    the visit-interval calculating section calculates the visit interval to make a visit for maintenance work for each consumable part on the basis of the failure rate distribution calculated by the failure-rate-distribution calculating section and the maintenance historical data; and
    the replacement-interval calculating section calculates the replacement interval to replace the consumable parts for each consumable part on the basis of the failure rate distribution calculated by the failure-rate-distribution calculating section and the maintenance historical data.

3. The maintenance system according to claim 1, wherein:
    the visit-interval calculating section calculates the visit interval at random, and the replacement-interval calculating section calculates the replacement interval at random; and
    the visit-timing calculating section obtains a combination of a visit interval and a replacement interval in which a predetermined cost is the minimum, on the basis of the visit interval calculated by the visit-interval calculating section and the replacement interval calculated by the replacement-interval calculating section.

4. The maintenance system according to claim 3, wherein the visit interval calculated for each consumable part by the visit-interval calculating section is set longer than the replacement interval calculated by the replacement-interval calculating section.

5. The maintenance system according to claim 3, wherein the predetermined cost is the sum of labor costs for the maintenance work by a serviceman, material costs for the consumable parts, and the loss due to the reason that the user cannot use the machine to be maintained.

6. The maintenance system according to claim 1, wherein the visit-timing calculating section obtains a combination of a visit interval and a replacement interval in which a predetermined cost is the minimum by search processing using a Monte Carlo method or a generic algorithm on the basis of the visit interval calculated by the visit-interval calculating section and the replacement interval calculated by the replacement-interval calculating section.

7. The maintenance system according to claim 1, wherein the visit-timing calculating section calculates a list of a next visit timing and consumable parts to be replaced at the next visit timing on the basis of the visit interval calculated by the visit-interval calculating section and the replacement interval calculated by the replacement-interval calculating section.

8. The maintenance system according to claim 1, wherein the visit-interval calculating section and the replacement-interval calculating section calculate values close to intervals at which the failure rate is estimated to be higher than a predetermined rate, on the basis of the failure rate distribution of each consumable part, which is calculated by the failure-rate-distribution calculating section.

9. A maintenance method for calculating a timing to make a visit for maintenance work of consumable parts of a machine to be maintained, the method comprising:
    a failure-rate-distribution calculating step of calculating the failure rate distribution of each consumable part on the basis of maintenance historical data, that is, history information on maintenance work performed for the machine to be maintained;
    a visit-interval calculating step of calculating a visit interval to make a visit for maintenance work for each consumable part on the basis of the failure rate distribution calculated in the failure-rate-distribution calculating step and the maintenance historical data;
    a replacement-interval calculating step of calculating a replacement interval to replace the consumable parts for each consumable part on the basis of the failure rate distribution calculating in the failure-rate-distribution calculating step and the maintenance historical data; and
    a visit-timing calculating step of calculating a timing to actually visit the machine to be maintained on the basis of the visit interval calculated in the visit-interval calculating step and the replacement interval calculated in the replacement-interval calculating step.

10. The maintenance method according to claim 9, wherein
    in the visit-interval calculating step, the visit interval is calculated at random, and in the replacement-interval calculating step, the replacement interval is calculated at random; and
    in the visit-timing calculating step, a combination of a visit interval and a replacement interval in which a predetermined cost is the minimum is obtained on the basis of the visit interval calculated in the visit-interval calculating step and the replacement interval calculated in the replacement-interval calculating step.

11. The maintenance method according to claim 10, wherein
    the predetermined cost is the sum of labor costs for the maintenance work by a serviceman, material costs for the consumable parts, and the loss due to the reason that the user cannot use the machine to be maintained.

12. The maintenance method according to claim 10, wherein
in the visit-timing calculating step, a combination of a combination of a visit interval and a replacement interval in which a predetermined cost is the minimum is obtained by search processing using a Monte Carlo method or a generic algorithm on the basis of the visit interval calculated in the visit-interval calculating step and the replacement interval calculated in the replacement-interval calculating step.

13. The maintenance method according to claim 9, wherein
in the visit-timing calculating step, a list of a next visit timing and consumable parts to be replaced at the next visit timing is calculated on the basis of the visit interval calculated in the visit-interval calculating step and the replacement interval calculated in the replacement-interval calculating step.

14. The maintenance method according to claim 9, wherein
in the visit-timing calculating step and the replacement-interval calculating step, values close to intervals at which the failure rate is estimated to be higher than a predetermined rate are calculated on the basis of the failure rate distribution of each consumable part, which is calculated in the failure-rate-distribution calculating step.

15. A computer-readable storage medium storing a maintenance program for a computer to execute a process of calculating a timing to make a visit for maintenance work for consumable parts of a machine to be maintained, the maintenance program including instructions which, when executed, cause the computer to perform actions comprising:
a failure-rate-distribution calculating step of calculating the failure rate distribution of each consumable part on the basis of maintenance historical data, that is, history information on maintenance work performed for the machine to be maintained;
a visit-interval calculating step of calculating a visit interval to make a visit for maintenance work for each consumable part on the basis of the failure rate distribution calculated in the failure-rate-distribution calculating step and the maintenance historical data;
a replacement-interval calculating step of calculating a replacement interval to replace the consumable parts for each consumable part on the basis of the failure rate distribution calculated in the failure-rate-distribution calculating step and the maintenance historical data; and
a visit-timing calculating step of calculating a timing to actually visit the machine to be maintained on the basis of the visit interval calculated in the visit-interval calculating step and the replacement interval calculated in the replacement-interval calculating step.

16. The computer-readable storage medium according to claim 15, wherein
in the visit-interval calculating step, the visit interval is calculated at random, and in the replacement-interval calculating step, the replacement interval is calculated at random; and
in the visit-timing calculating step, a combination of a visit interval and a replacement interval in which a predetermined cost is the minimum is obtained on the basis of the visit interval calculated in the visit-interval calculating step and the replacement interval calculated in the replacement-interval calculating step.

17. The computer-readable storage medium according to claim 16, wherein
the visit interval calculated for each consumable part in the visit-interval calculating step is set longer than the replacement interval calculated in the replacement-interval calculating step.

18. The computer-readable storage medium according to claim 16, wherein
the predetermined cost is the sum of labor costs for the maintenance work by a serviceman, material costs for the consumable parts, and the loss due to the reason that the user cannot use the machine to be maintained.

19. The computer-readable storage medium according to claim 16, wherein
in the visit-timing calculating step, a combination of a visit interval and a replacement interval in which a predetermined cost is the minimum is obtained by search processing using a Monte Carlo method or a generic algorithm on the basis of the visit interval calculated in the visit-interval calculating step and the replacement interval calculated in the replacement-interval calculating step.

20. The computer-readable storage medium according to claim 15, wherein
in the visit-timing calculating step, a list of a next visit timing and consumable parts to be replaced at the next visit timing is calculated on the basis of the visit interval calculated in the visit-interval calculating step and the replacement interval calculated in the replacement-interval calculating step.

* * * * *